United States Patent
Schroter et al.

(10) Patent No.: US 8,146,259 B2
(45) Date of Patent: Apr. 3, 2012

(54) ROTARY ENCODER AND SERIES OF ROTARY ENCODERS

(75) Inventors: Andreas Schroter, Traunstein (DE); Sebastian Riepertinger, Soechtenau (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 13/000,785

(22) PCT Filed: Jun. 30, 2009

(86) PCT No.: PCT/EP2009/058147
§ 371 (c)(1),
(2), (4) Date: Dec. 22, 2010

(87) PCT Pub. No.: WO2010/003845

PCT Pub. Date: Jan. 14, 2010

(65) Prior Publication Data
US 2011/0094115 A1    Apr. 28, 2011

(30) Foreign Application Priority Data
Jul. 10, 2008    (DE) .......................... 10 2008 032 419

(51) Int. Cl.
G01B 7/30    (2006.01)
(52) U.S. Cl. ....................................................... 33/1 PT
(58) Field of Classification Search ............... 33/1 N, 33/1 PT, 706, 707, 708
See application file for complete search history.

(56) References Cited

U.S. PATENT DOCUMENTS

| 4,652,748 | A | 3/1987 | Siraky et al. | |
|---|---|---|---|---|
| 5,758,427 | A | 6/1998 | Feichtinger et al. | |
| 5,984,564 | A | 11/1999 | Mitterreiter | |
| 7,316,071 | B2 * | 1/2008 | Harrer | 33/1 PT |
| 7,637,019 | B2 * | 12/2009 | Brandl | 33/1 PT |
| 2008/0066327 | A1 * | 3/2008 | Mitterreiter | 33/1 PT |
| 2009/0230825 | A1 | 9/2009 | Braun et al. | |
| 2011/0078911 | A1 * | 4/2011 | Driker et al. | 33/1 PT |
| 2011/0131821 | A1 * | 6/2011 | Goll et al. | 33/1 PT |

FOREIGN PATENT DOCUMENTS

| DE | 35 37 235 | 4/1987 |
|---|---|---|
| DE | 34 27 709 | 11/1989 |
| DE | 197 29 452 | 1/1998 |
| DE | 296 23 537 | 1/1999 |
| DE | 198 06 661 | 8/1999 |
| EP | 0 533 973 | 3/1993 |
| GB | 2 314 139 | 12/1997 |
| WO | WO 2008/034768 | 3/2008 |

* cited by examiner

OTHER PUBLICATIONS

International Search Report, PCT International Application No. PCT/EP2009/058147, dated Nov. 16, 2009.

*Primary Examiner* — G. Bradley Bennett
(74) *Attorney, Agent, or Firm* — Kenyon & Kenyon LLP

(57) ABSTRACT

A rotary encoder includes a stator and a rotor, the rotor being disposed in a manner allowing rotation relative to the stator with the aid of a bearing. The rotor has a shaft, a positive-locking device as well as a code disk being secured in rotatably fixed manner to the shaft. The stator has a body having a scanning device for scanning the code disk, a compensating coupling and a housing. The body is joined to the housing by the compensating coupling. The housing has a further positive-locking device, the rotary encoder being pre-adjusted such that in operation of the rotary encoder, at a predefined relative angular position between the positive-locking device of the shaft and the further positive-locking device of the housing, a predefined angle value is able to be output by the rotary encoder. A series of rotary encoders may be provided.

15 Claims, 3 Drawing Sheets

ROTARY ENCODER AND SERIES OF ROTARY ENCODERS

FIELD OF THE INVENTION

The present invention relates to a rotary encoder as well as a series of rotary encoders.

BACKGROUND INFORMATION

Rotary encoders are used to measure rotary motions of a rotationally mounted body, particularly a shaft, over one or more rotations. In so doing, the rotary motion is recorded incrementally or absolutely. In connection with gear racks and gear wheels or with threaded spindles, linear motions can also be measured by a rotary encoder.

Rotary encoders are used in large numbers as what are termed motor-feedback devices, and in this practical application, are used to form position or angle information, which is utilized for the commutation of electrical drives. For example, in the case of synchronous motors, information about the absolute rotor position is needed immediately after the supply voltage is switched on. Rotary encoders with additional commutation signals—they supply relatively rough position information—and absolute rotary encoders in single-turn or multiturn design, which output the exact angular position immediately with a few angular seconds accuracy, are suitable for this purpose.

During the mounting of these measuring devices, the rotor positions of the electric motor and of the rotary encoder must be assigned to each other in order to achieve the most constant motor currents possible. An inadequate allocation with respect to the electromotive force causes considerable motor noise and high power losses.

In the case of conventional rotary encoders, for this purpose, initially the rotor of the electric motor, i.e., its shaft, is brought into a preferred position by applying a direct current. Rotary encoders with commutation signals are then roughly aligned, e.g., with the aid of marking lines on the rotary encoder or a reference-mark signal. The shaft of the rotary encoder is then mounted on the shaft of the electric motor. The precision adjustment is then made with the aid of a phase-angle measuring device, in the course of which, the stator of the rotary encoder is rotated until the phase-angle measuring device indicates approximately the value zero as distance to a reference mark. Finally, in this position, a compensating coupling, particularly a stator coupling, can be fixed in position on the motor housing.

Absolute rotary encoders are first completely mounted. Thereupon, the value "zero" is assigned to the preferred position of the electric motor by a zero shift. Electronic equipment, including an appropriate software package, e.g., in a computer connected to the rotary encoder, is used as an aid for this purpose. A zero shift is thereby able to be performed.

German Patent No. 197 29 452 describes an adapter component which permits an angle-wise allocation between a rotary-encoder shaft and a motor shaft. The stator must be rotated for the precision adjustment here, as well, and finally a stator coupling must be affixed to the motor housing.

Conventional devices having stator couplings have the disadvantage that the precision adjustment must be carried out in the field individually for each installation situation, and that frequently a fixation of the mechanically sensitive compensating couplings is then necessary in the field.

It is also conventional that the attachment of rotary encoders which supply commutation signals may be simplified by mechanically coded rotor couplings, as described, for example, in PCT International Published Patent Application No. WO 2008/034768. However, a use of rotor couplings is always accompanied by losses in the accuracy of the commutation signals.

SUMMARY

Example embodiments of the present invention provide a rotary encoder of the type indicated at the outset, which is able to be simply mounted, and by which a comparatively high measuring accuracy is attainable.

Accordingly, the rotary encoder according to an example embodiment of the present invention includes a stator and a rotor, the rotor being disposed in a manner allowing rotation relative to the stator with the aid of a bearing. The rotor has a shaft, to which a positive-locking device as well as a code disk are secured in rotatably fixed manner. The stator has a body, a compensating coupling and a housing. The body includes a scanning device for scanning the code disk, so that angle values are able to be output by the rotary encoder as a function of the relative angular position between the shaft and the housing. Furthermore, the body is joined to the housing via the compensating coupling in a manner that is radially and axially flexible, but torsionally stiff. In addition, the housing has a further positive-locking device, the rotary encoder being pre-adjusted such that in operation of the rotary encoder, at a predefined relative angular position between the positive-locking device of the shaft and the further positive-locking device of the housing, a predefined angle value is able to be output by the rotary encoder.

Thus, in response to a predefined orientation of the positive-locking device of the shaft relative to the further positive-locking device of the housing, the rotary encoder always outputs the same predefined angle value. Since the orientation of the positive-locking devices is able to be produced by the relative rotation between rotor and stator, this orientation is denoted here as predefined relative angular position.

Thus, as a result of the positive-locking devices, the rotary encoder is only able to be attached to an electric motor in reference-true fashion, e.g., with regard to the commutation signals. The predefined angle value may also be denoted as reference value.

The code disk may bear an absolute coding, so that the scanning device is able to detect an absolute and unambiguous angular position within one rotation of the code disk, and the rotary encoder is able to output an absolute angle value. In this case, it may be advantageous if the stator includes a non-volatile memory in which, corresponding to the pre-adjustment, data are stored which represent information about the angular position of the two positive-locking devices relative to each other.

The housing advantageously has a flange; the positive-locking device may be disposed on the flange.

The positive-locking device of the housing may take the form of an alignment pin.

Advantageously, the positive-locking device of the shaft is in the form of a component that is asymmetrical relative to the axis. Thus, a unique combination with a mating component, e.g., a shaft of an electric motor, is able to be ensured. In particular, the positive-locking device of the shaft may have recesses which, for example, are formed as setoffs in the axial direction.

Alternatively, the code disk may bear an incremental coding. Particularly in this case, the compensating coupling may be configured such that the relative angular position between the positive-locking devices is able to be pre-adjusted by relative movement between the compensating coupling and the body and/or between the compensating coupling and the housing. For this purpose, the compensating coupling may have elongated holes for securing the compensating coupling to the housing using screws.

Example embodiments of the present invention provide a series of rotary encoders. In this context, each rotary encoder of the series is pre-adjusted such that in operation of the respective rotary encoder, at one and the same relative angular position between the respective positive-locking device of the shaft and the respective further positive-locking device of the respective housing, one and the same predefined angle value is able to be output by the rotary encoder.

Due to an individual pre-adjustment, different data corresponding to the pre-adjustment and representing information about the angular position of the two positive-locking devices relative to each other may then be stored in the respective non-volatile memory of rotary encoders within the series.

Alternatively—especially if the series includes rotary encoders which in each case bear a code disk having an incremental coding—the rotary encoders may include positive-locking devices of the shaft which, angle-wise, are in each instance oriented identically relative to the code disk.

In principle, the series may include rotary encoders which have one or more of the rotary-encoder features disclosed here.

Other features and advantages of example embodiments of the present invention are described in the following description with reference to the figures.

DETAILED DESCRIPTION

Figure 1:
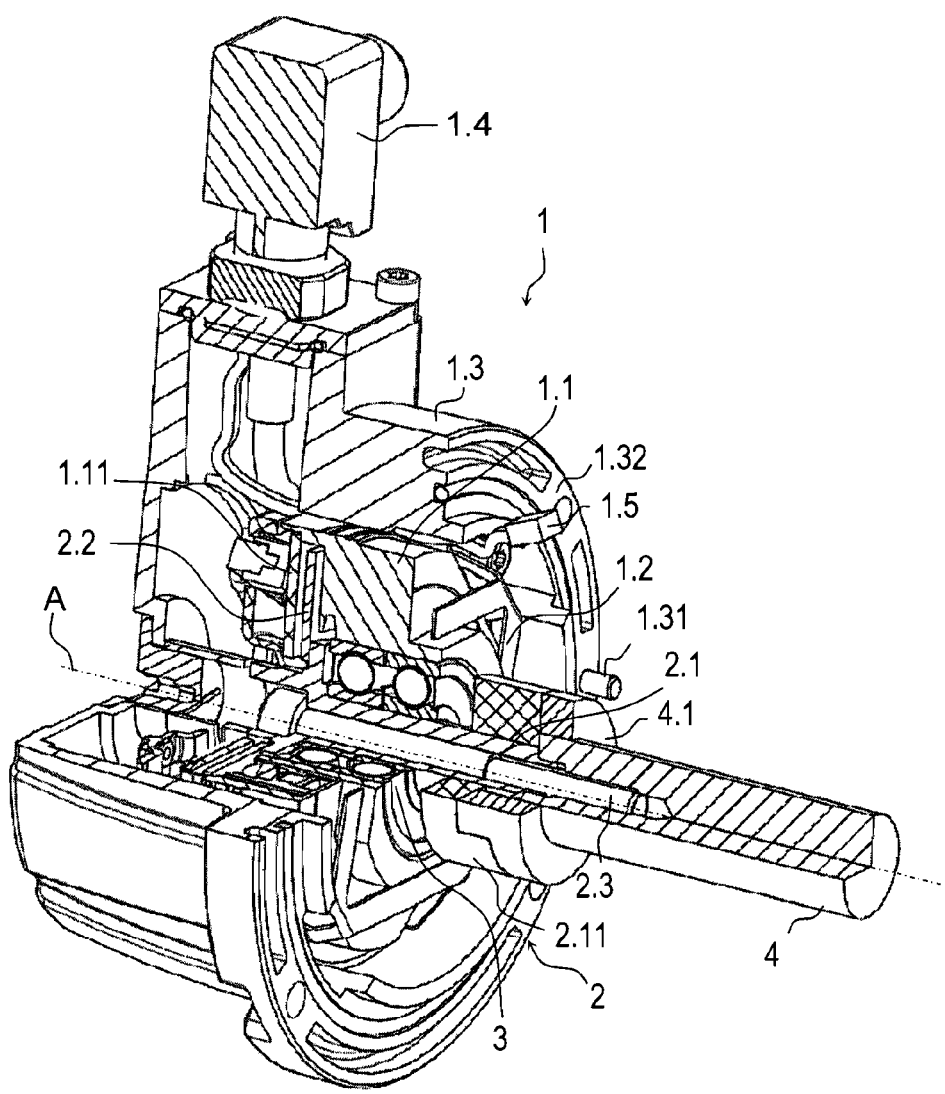
FIG. 1 shows a perspective sectional view of a rotary encoder.
Figure 2:
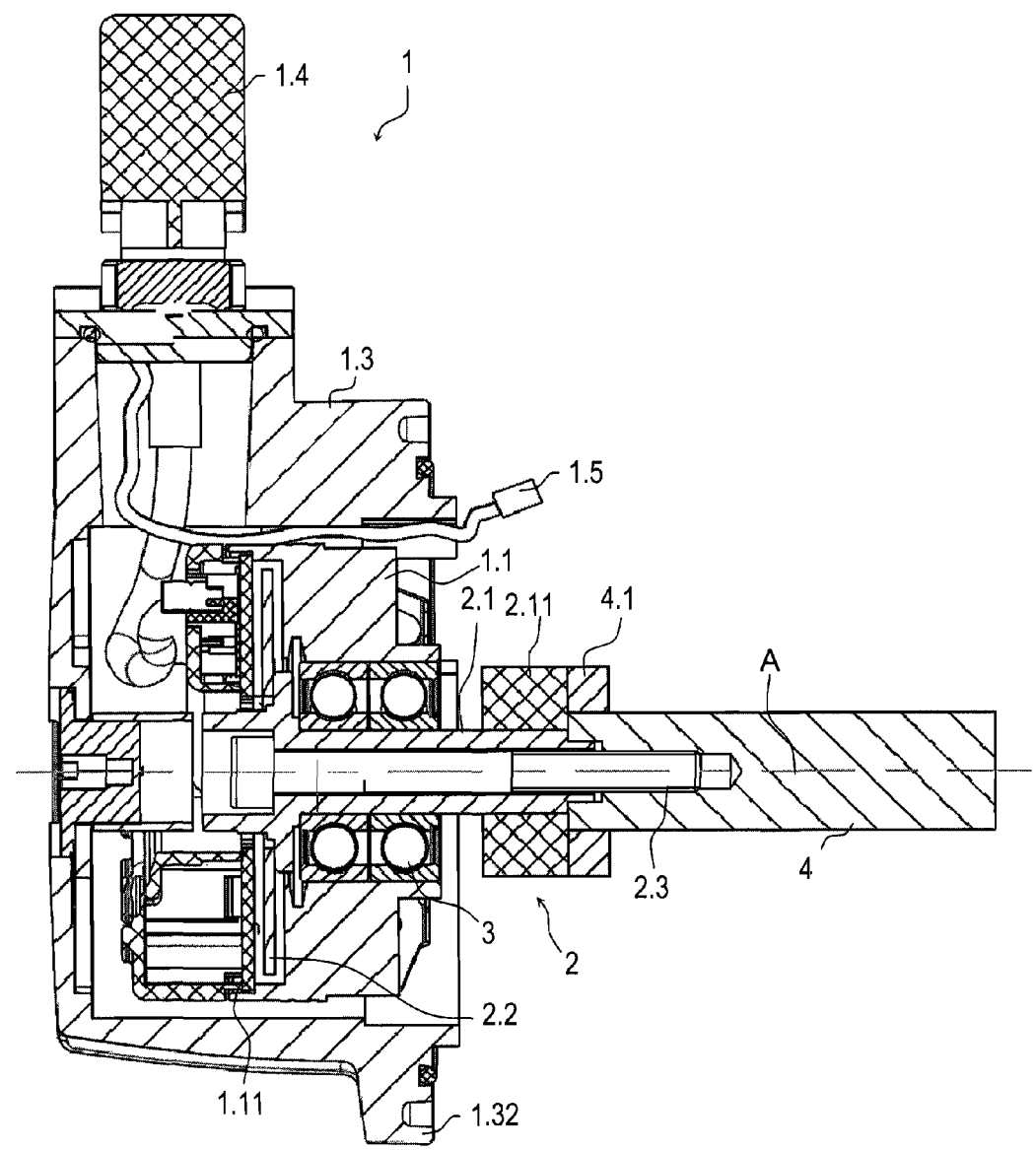
FIG. 2 shows a longitudinal section through the rotary encoder.
Figure 3:
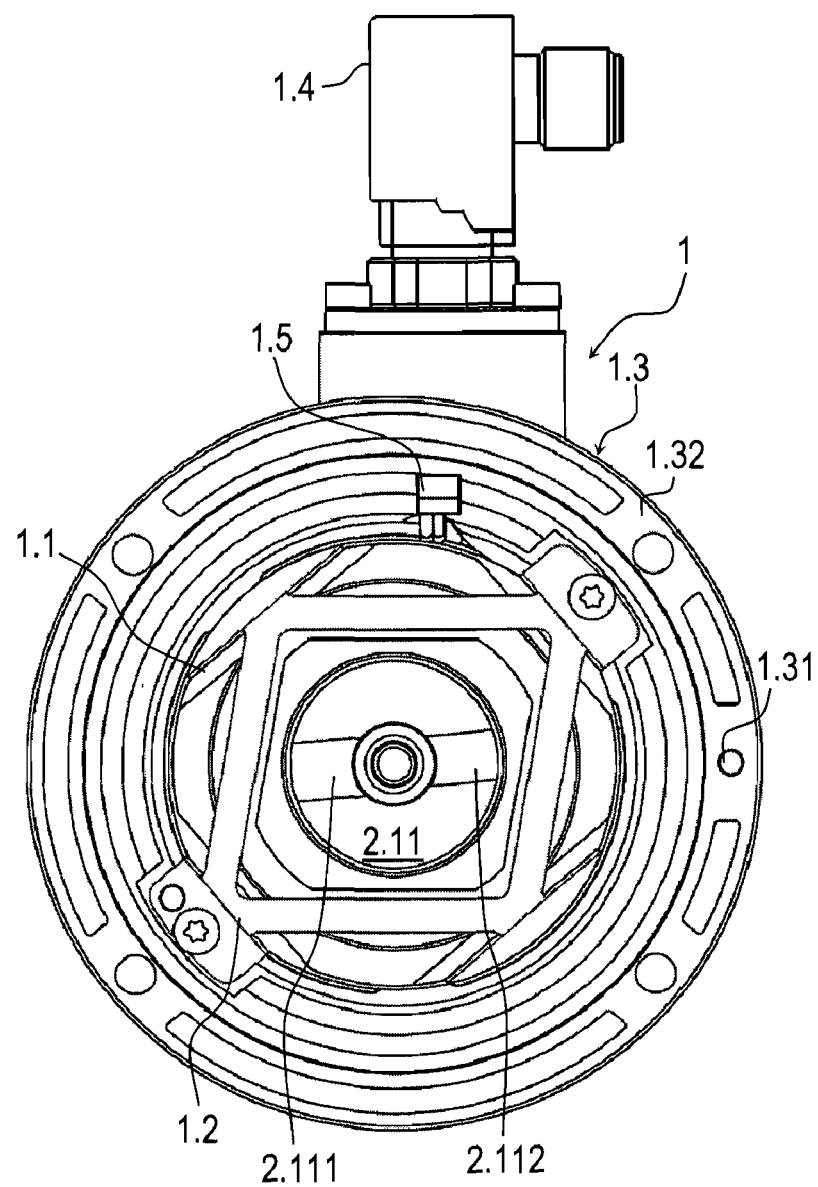
FIG. 3 shows a side view of the rotary encoder.

The rotary encoder shown in FIGS. 1 through 3 includes a stator 1, a rotor 2 and a bearing 3. Rotor 2 is disposed in a manner allowing rotation about an axis A relative to stator 1 with the aid of bearing 3. In the exemplary embodiment illustrated, the rotary encoder is used to generate commutation signals for an electric motor, on which the rotary encoder may be flange-mounted.

Situated within, the stator includes a body 1.1 to which, inter alia, a scanning device 1.11 is affixed. Scanning device 1.11 includes a printed circuit board having detectors, e.g., photodetectors. Also disposed on the printed circuit board are electrical components for signal conditioning—e.g., for amplifying and digitizing—the scanning signals provided by the detectors. In particular, an electronic component which includes a non-volatile memory is also mounted on the printed circuit board.

Disposed around body 1.1 is a cap-shape housing 1.3 that hermetically seals off the inner components of the rotary encoder against external influences. Such rotary encoders are frequently used in comparatively hostile industrial environments, which is why it is important that corresponding housing 1.3 imperviously encloses the interior of the rotary encoder. An alignment pin 1.31, which is used as a positive-locking device, is disposed on housing 1.3, that is, on a flange 1.32 of housing 1.3. A compensating coupling 1.2 joins body 1.1 to housing 1.3 in an axially and radially flexible manner. Nevertheless, compensating coupling 1.2 is constructed such that it is stiff in the circumferential direction.

Furthermore, compensating coupling 1.2 has bore holes for the attachment by screws to housing 1.3. An electrical coupling 1.4 is mounted on housing 1.3 for the electrical connection of the rotary encoder to a voltage supply and sequential electronics. In addition, temperature signals are passed on to the sequential electronics by this electrical coupling 1.4. The corresponding temperature sensors, e.g., resistance sensors, are placed in the electric motor, the temperature signals generated being transmitted with the aid of a cable 1.5 that is routed through stator 1.

A shaft 2.1 for the connection to a motor shaft 4 is assigned to rotor 2. Both shaft 2.1 and motor shaft 4 have positive-locking devices 2.11, 4.1 that, in each case, are joined in rotatably fixed manner to shaft 2.1 and to motor shaft 4, respectively. A code disk 2.2 is also secured in rotatably fixed manner on shaft 2.1. Thus, code disk 2.2 is rotatable about axis A, and in the example shown, is scanned photoelectrically by scanning device 1.11. In the present exemplary embodiment, code disk 2.2 bears an absolute coding, so that scanning device 1.11 detects an absolute and unambiguous angular position within one rotation of code disk 2.2.

At the manufacturer of the rotary encoder, alignment pin 1.31 is first of all pressed into a corresponding bore hole in flange 1.32. In the same manner, a rotatably-fixed connection between a positive-locking part 2.11 as positive-locking device and shaft 2.1 is produced by a press fit. Positive-locking part 2.11, here a precisely fabricated metal part, has two recesses 2.111, 2.112 of different width, so that it is asymmetrical relative to axis A, thus, is not centrosymmetric with respect to one point on axis A.

For the pre-adjustment, initially the rotary encoder is mounted with flange 1.32 on an auxiliary device. The auxiliary device includes a bore hole in which alignment pin 1.31 is pressed in place without play. Next, an adjusting device engages in recesses 2.111, 2.112 without play, so that the adjusting device is able to introduce a rotary motion into shaft 2.1. In this phase, an angle-true mounting of the rotary encoder on the auxiliary device is ensured.

After that, a cable to electronic equipment is attached to electrical coupling 1.4. The absolute angle information detected by scanning device 1.11 may be read out with the aid of the electronic equipment.

The adjusting device is then rotated until a predefined relative angular position exists between positive-locking part 2.11 and alignment pin 1.31. For example, when a position is reached in which the radial axis of symmetry of recesses 2.111, 2.112 intersects the middle of alignment pin 1.31. In this position, which may be approached very exactly at the manufacturer, e.g., to ±0.25°, the absolute angular position is determined and, if applicable, a corresponding angle value is output by the rotary encoder via electrical coupling 1.4. These data, which represent information about the angular position between positive-locking part 2.11 and alignment pin 1.31 relative to each other, are stored as reference value in the non-volatile memory and are taken into account in the later operation of the rotary encoder. All rotary encoders of a series are referenced according to the same method. Because manufacturing tolerances exist for each rotary encoder within a series, after the individual pre-adjustment, in each case different data may be stored in each rotary encoder in the respective non-volatile memory.

During the attachment of the rotary encoder in the field, alignment pin 1.31 is pressed into a correspondingly prepared, precise bore hole in the housing of the electric motor. At the same time, positive-locking part 2.11 on shaft 2.1 is inserted into a positive-locking device 4.1 on motor shaft 4 with the aid of screw 2.3. Due to the asymmetrical design, shaft 2.1 and motor shaft 4 are only able to be brought into engagement with each other in one predefined angular position. In the assembled state, positive-locking part 2.11 and positive-locking device 4.1 then engage without play. The screw connection produces a rigid connection between shaft 2.1 and motor shaft 4. Thus, no more adjustment of the rotary encoder has to be made in mounting the rotary encoder on the electric motor.

In operation of the rotary encoder, it is ensured that at a specific angular position, here, for example, in the position in which the radial axis of symmetry of recesses 2.111, 2.112 intersects the middle of alignment pin 1.31, the reference value is always output to the sequential electronics, so that an extremely precise commutation of the electric motor is achieved.

As a further advantage, rotary encoders of the same series may be exchanged in the field as needed without adjustment measures, because all rotary encoders have a suitable correction position stored in their non-volatile memory.

What is claimed is:

1. A rotary encoder, comprising:
   a stator; and
   a rotor rotatable relative to the stator via a bearing;
   wherein the rotor includes a shaft, a first positive-locking device, and a code disk secured in rotatably fixed manner to the shaft;
   wherein the stator includes a body having a scanning device adapted to scan the code disk, a compensation coupling, and a housing, the body joined to the housing via the compensation coupling in a manner that is radially and axially flexible, but torsionally stiff; and
   wherein the housing includes a second positive-locking device, the rotary encoder pre-adjusted such that in operation of the rotary encoder, at a predefined relative angular position between the first positive-locking device and the second positive-locking device of the housing, a predefined angle value is outputable by the rotary encoder.

2. The rotary encoder according to claim 1, wherein the code disk bears an absolute coding, the scanning device adapted to detect an absolute and unambiguous angular position within one rotation of the code disk.

3. The rotary encoder according to claim 1, wherein the stator includes a non-volatile memory adapted to store, corresponding to the preadjustment, data representing information about the angular position of the first positive-locking device and the second positive-locking device relative to each other.

4. The rotary encoder according to claim 1, wherein the housing includes a flange, and the second positive-locking device is disposed on the flange.

5. The rotary encoder according to claim 1, wherein the second positive-locking device is arranged as an alignment pin.

6. The rotary encoder according to claim 1, wherein the first positive-locking device is arranged asymmetrically relative to a rotary axis of the rotary encoder.

7. The rotary encoder according to claim 1, wherein the compensation coupling is configured such that the relative angular position between the first positive-locking device and the second positive-locking device is pre-adjustable by relative movement between the compensation coupling and at least one of (a) the body and (b) the housing.

8. A series of rotary encoders, each rotary encoder including:
   a stator; and
   a rotor rotatable relative to the stator via a bearing;
   wherein the rotor includes a shaft, a first positive-locking device, and a code disk secured in rotatably fixed manner to the shaft;
   wherein the stator includes a body having a scanning device adapted to scan the code disk, a compensation coupling, and a housing, the body joined to the housing via the compensation coupling in a manner that is radially and axially flexible, but torsionally stiff; and
   wherein the housing includes a second positive-locking device, the rotary encoder pre-adjusted such that in operation of the rotary encoder, at a predefined relative angular position between the first positive-locking device and the second positive-locking device of the housing, a predefined angle value is outputable by the rotary encoder.

9. The series of rotary encoders according to claim 8, wherein, in each rotary encoder, the code disk bears an absolute coding, the scanning device adapted to detect an absolute and unambiguous angular position within one rotation of the code disk.

10. The series of rotary encoders according to claim 8, wherein, in each rotary encoder, the stator includes a non-volatile memory adapted to store, corresponding to the pre-adjustment, data representing information about the angular position of the first positive-locking device and the second positive-locking device relative to each other.

11. The series of rotary encoders according to claim 8, wherein, in each rotary encoder, the housing includes a flange, and the second positive-locking device is disposed on the flange.

12. The series of rotary encoders according to claim 8, wherein, in each rotary encoder, the second positive-locking device is arranged as an alignment pin.

13. The series of rotary encoders according to claim 8, wherein, in each rotary encoder, the first positive-locking device is arranged asymmetrically relative to a rotary axis of the rotary encoder.

14. The series of rotary encoders according to claim 8, wherein, in each rotary encoder, the compensation coupling is configured such that the relative angular position between the first positive-locking device and the second positive-locking device is pre-adjustable by relative movement between the compensation coupling and at least one of (a) the body and (b) the housing.

15. A series of rotary encoders, wherein each rotary encoder is arranged as recited in claim 1.

* * * * *